United States Patent

[11] 3,573,402

[72] Inventor Charles W. Chambers, Jr.
Amherst, Ohio
[21] Appl. No. 810,185
[22] Filed Mar. 25, 1969
[45] Patented Apr. 6, 1971
[73] Assignee Lorain Products Corporation

[54] BIDIRECTIONAL ADDITIVE AMPLIFIER
7 Claims, 2 Drawing Figs.

[52] U.S. Cl. .......... 179/170, 179/1, 330/127
[51] Int. Cl. .......... H03f 3/62
[50] Field of Search .......... 179/170, 1 (VC); 330/127; 330/(Inquired)

[56] References Cited
UNITED STATES PATENTS
3,330,912 7/1967 Koseki .......... 179/1VCX
3,359,378 12/1967 Skeer .......... 179/170

*Primary Examiner*—Kathleen H. Claffy
*Assistant Examiner*—William A. Helvestine
*Attorney*—John Howard Smith

ABSTRACT: An electrical, two-terminal, bidirectional amplifier circuit which senses the direction of flow of a signal current through an ancillary source-load loop in which current flow may be bidirectional, to insert a boost voltage additively in series aiding relationship with the signal current irrespective of the direction of current flow in that source-load loop and then senses the instantaneous state of the signal current to control the magnitude of the added power. The amplifier is insensitive to the direction of transmitted intelligence through the source-load loop by the signal current and inserts the boost voltage additively as required, in the face of the interchange of position of the sources and receivers of intelligence with respect to the amplifier terminals as, for instance, in telephone circuitry.

PATENTED APR 6 1971 3,573,402

INVENTOR.
CHARLES W. CHAMBERS, JR.

BY John Howard [signature]

BIDIRECTIONAL ADDITIVE AMPLIFIER

BACKGROUND OF THE INVENTION

The present invention relates to an improved amplifier and is directed more particularly to such a device which is bidirectional and adapted to supply a boost voltage, for example, in intelligence-transmitting and -receiving circuits.

Where it is required to strengthen a transmitted signal from a signal source to a load, it has been the practice to utilize this signal source as merely a control input to an amplifier which, in turn, alone supplies signal current to the load from an amplifier power source.

Amplification systems of this type have two important shortcomings.

First, they do not utilize the signal current available from the signal source to furnish load power but use it only for amplifier control purposes. Because the signal current in the load must be derived solely from the amplifier power source to compensate for this unavailable signal source current, amplification systems utilized heretofore required the provision of an amplifier power source of uneconomically larger power rating, when the desired amplification was low. If, for example, a signal source has a rating sufficient to supply 50 percent of the required load current, it is wasteful if this current, as in present practice, does not flow through the load. Furthermore, an amplifier power source of unnecessarily large power rating is required to supply the load. In accordance with the present invention both the signal source and the amplifier source supply the load.

Another limitation of earlier amplifier systems is that amplification occurs only for signals applied at a predesignated input and removed at a predesignated output, whereas many applications involving the transmission of intelligence by wire require signal amplification for signals originating at either end of the line. It will be understood that the term intelligence includes not only transmitted and received information, but also transmitted and received commands, as for example, in the remote control of a mechanism at an inaccessible location.

In some applications, for example in telephony, it is desirable that the introduction of an amplifier into a telephone line which carries a DC current level with a superimposed voice signal results in the establishment of a strengthened voice signal and a substantially unchanged DC current level bidirectionally, on a single wire pair (tip and ring). Heretofore, this has been accomplished by the use of a pair of amplifiers (sending and receiving) isolated by what is referred to as a "hybrid." The effectiveness of the "hybrid" is directly dependent upon the balancing of line impedances, thus entailing considerable difficulty. The requirement for signal current amplification for signals originating at either end of the line is apparent, since a useful telephone set must be able to transmit as well as receive.

Under other circuit conditions the transmitted intelligence may be a reversal in the direction of DC current flow which occurs for signaling or control purposes. Telephone central offices which utilize reverse battery supervision, for example, reverse the connections of central office battery to the terminals of a subscriber line to record the completion of a call by a calling party. If such a subscriber line should terminate far from the central office it may be necessary to increase the DC operating voltage applied thereto in order to maintain an adequate operative current flow. Rather than provide a separate set of batteries of higher voltage to operate those relatively few long subscriber lines requiring the higher voltage, it is desirable that a single, generally adequate central office battery voltage level be maintained and that the higher voltages required for those relatively few long subscriber lines be derived therefrom by independent amplification.

SUMMARY OF THE INVENTION

It is an important object of the invention to provide an improved amplifier having circuitry so arranged that power from a signal source is additively combined with power from an amplifier power source to contribute to an increase in the power available at the output.

It is a further object of the invention to provide amplifier circuitry capable of operating in two modes, the first mode of operation being dictated by the flow of current through the amplifier in a first direction, and a second mode of operation occuring when the flow of current through the amplifier is in a second direction.

It is another object of the invention to provide an amplifier circuit having input-output symmetry, whereby the input and output terminals may be functionally interchanged while the amplifier is in operation.

More specifically, it is an object of the invention to provide an amplifier circuit having first and second terminals so arranged that either the first or the second terminal may serve as the input for transmitted intelligence while the other terminal serves as the output therefor, there being no circuit modifications required to alternately utilize either terminal of the amplifier as the input or output terminal thereof.

Another attribute of an amplifier embodying the present invention is the ability thereof to amplify opposite going intelligence transmitted through the same source-load loop between stations in said loop, each station comprising a source of signal current and a receiver to receive such amplified, transmitted intelligence from the source of any other station in the loop.

Another object of the invention is to provide an amplifier circuit adapted in its general aspects to amplifying a variety of types of input signal currents.

More specifically, it is an object of the invention to provide an amplifier circuit which is adapted to amplify an AC signal whether or not this AC signal has an associated positive or negative DC component, and is also adapted to amplify a DC input signal of a positive or negative polarity, whether or not this DC signal has an associated AC component.

It is yet another object of the invention to provide an amplifier circuit wherein alternately operating electrical networks each including signal current direction-detecting and -sensing means, and network selector means connect a DC boost voltage source between a signal source and a load, and wherein the conduction of said means is controlled in accordance with the transmitted signal to add a portion of the voltage across the DC boost voltage source in current increasing relationship to this transmitted signal.

Still another object of the invention is to provide an amplifying arrangement of the above character which can be connected in series with one side of a transmission line so as to eliminate the need for leakage resistances across the line.

Generally speaking, the additive amplifier disclosed herein comprises a biterminal device for insertion in a source-load loop containing two or more transceiving stations. Signal current flowing through the amplifier is utilized to control the amount of boost voltage which is introduced between the source at one station and the load at any other station in power-aiding relationship to the originating source. In other words, the signal current source supplies a portion of the load power and the amplifier power source supplies the remainder of the load power. Because of the input-output symmetry of the detecting and sensing, and selecting circuitry of the amplifier, power boosting is achieved, in a first mode, for signal currents entering a first terminal and leaving a second terminal of the amplifier, as well as in a second mode for signal currents entering said second terminal and leaving said first terminal of the amplifier.

Other objects and advantages of the invention will become apparent from the following description and accompanying drawings in which:

DESCRIPTION OF THE INVENTION

Figure 1:
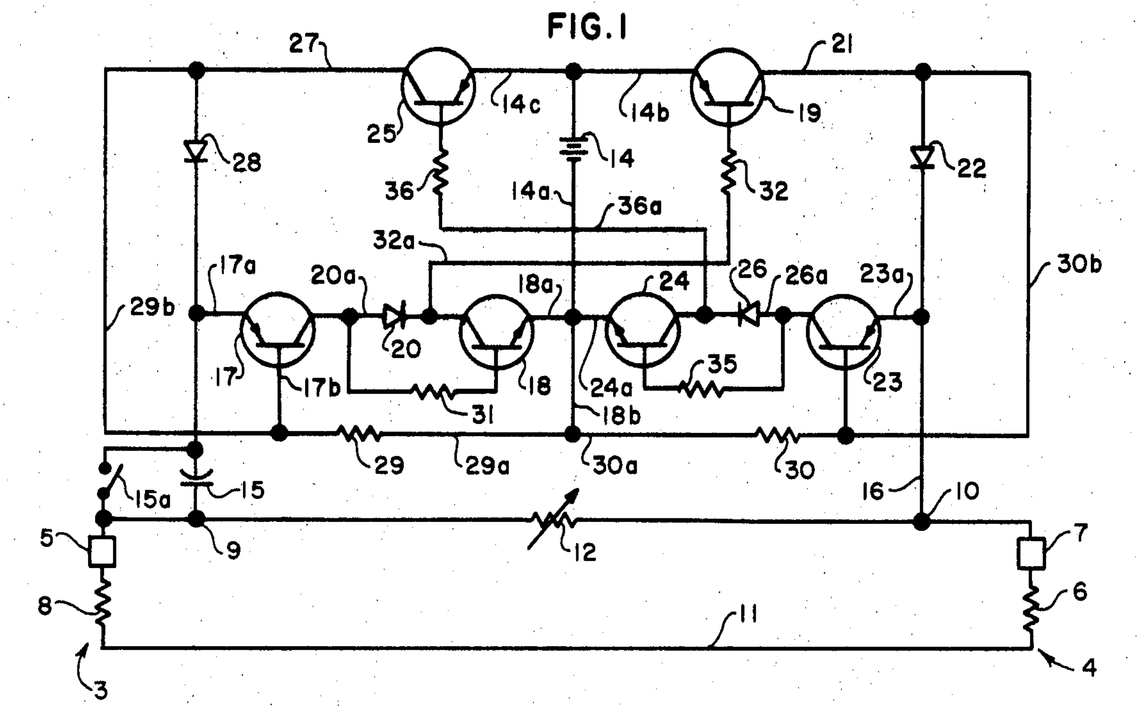
FIG. 1 is a schematic diagram of one form of the invention.

Referring to FIG. 1, which is a form of the invention adapted to amplify AC signals with or without associated DC components, there are provided in the present instance two stations 3 and 4 comprising respectively signal source 5 and load 8 and source 7 and load 6 respectively. These stations are linked by what will be referred to herein as the source-load loop. It will be seen that there is provided herein an intelligence communication system wherein amplified transmission and reception may be accomplished between any and all stations in the source-load loop. First and second terminal means 9 and 10 connect an amplifier control section embodying the invention between one side of station 3 and one side of station 4. A conductor 11 completes the source-load loop. Bypass means 12 which, in the present instance, takes the form of a variable resistance, permits the passage from station 3 to station 4, or vice versa, of any DC components which may be present in an input signal, and also serves to stabilize the operation of the amplifier control section, if such stabilization is required.

For purposes of description the respective stations will be referred to hereinafter by the respective load and sources shown therein.

To the end that the amplifier control section of FIG. 1 may establish an increased current in loads 6 and 8 depending on which direction the intelligence is being communicated through the source-load loop, in accordance with signal therein, a DC blocking capacitor 15 and a conductor 16 connect the amplifier control section, the bypass means 12, the signal sources 5 and 7 and the loads 6 and 8 in circuit relationship. The variable resistance 12 can be adjusted to control the amount of gain or amplification.

In order to obtain the advantages of the invention, an amplifier power source 14 is connected between the first and second terminals 9 and 10 respectively of the amplifier through signal current direction detecting and amplitude sensing, and network-selecting means to be more fully described presently. In addition to acting as a source of additive power boosting DC energy for the load, the amplifier power source 14 supplies the power required for the operation of the amplifier circuitry. During a first mode of operation, when signal current flows in a clockwise direction in the source-load loop as shown in FIG. 1, conduction is established in a first energizable electrical network through certain detecting and sensing, and selector means of the amplifier control section, and the amplifier power source 14 is connected between terminals 9 and 10 of the amplifier with a first polarity. Similarly, during a second mode of operation when signal current flows in a counterclockwise direction in the source-load loop as shown in FIG. 1, conduction is established in a second energizable electrical network through alternative detecting and sensing, and selector means of the amplifier control section, and the amplifier power source 14 is connected between terminals 9 and 10 of the amplifier with a second polarity.

The circuitry of the amplifier is arranged so that the conduction through the first and second networks of the amplifier is controlled severally in accordance with the direction and the magnitude of signal current through the amplifier to control the amount of boost voltage inserted in power-aiding relationship to the signal current established in the source-load loop by any or all stations located therein. For purposes of description herein, the source 5 and the load 6 will be referred to, it being understood that, in a similar manner, operation of the circuit is the same, in principle, when source 7 and load 8 are being utilized.

To the end that the foregoing may be accomplished, transistors 17 and 18, which serve as signal current direction-detecting means and signal current amplitude-sensing means, and transistor 19 which serves as network selector means are included in a network which connects amplifier power source 14 with a first polarity between terminals 9 and 10 when the amplifier control section is functioning in the first mode. Similarly, alternative detecting and sensing means which take the form of transistors 23 and 24 and alternative network selector means which takes the form of transistor 25 are included in a network which connects the amplifier power source 14 with a second polarity, opposite to said first polarity, between terminals 9 and 10 when the amplifier control section is functioning in its second mode.

Thus it will be seen that there is provided herein an amplifier arrangement having two terminals 9 and 10 for electrical series connection in a communications loop having a plurality of transceiver stations, the amplifier including alternate detecting and sensing means 17 and 18 or 23 and 25 respectively connected between a signal source 5 or 7 and the amplifier power source 14 together with alternate selector means 19 or 25 respectively connected between the loads 6 or 8 respectively and the amplifier power source 14. Because terminals 9 and 10 are in series with all signal sources and loads in the source-load loop the amplifier is responsive to the net current in the source-load loop not to the voltage across individual signal sources in the loop. It will be understood that while transistors of given types are utilized herein, the opposite type may be used in each instance if the DC supply voltages are reversed.

To the end that the amplifier power source 14 is incorporated in the circuit in power boosting, series-aiding relationship to the signal source 5, the amplifier functions in the following manner.

When the amplifier is operating in the first mode, that is through transistors 17, 18 and 19, a path for boosted signal current from terminal 9 to terminal 10 through a first energizable electrical network includes terminal 9, capacitor 15, conductor 17*a*, the emitter-collector power path or circuit of the PNP transistor 17, a conductor 20*a*, unidirectional conducting means 20, herein comprising a diode, the collector-emitter power path or circuit of the NPN transistor 18, conductors 18*a* and 14*a*, amplifier power source 14, from negative to positive terminal a conductor 14*b*, the power path or circuit of selector means (which herein takes the form of a PNP transistor 19), a conductor 21, a voltage-dropping means 22, conductor 16 and terminal 10.

Similarly, when the amplifier is functioning in the second mode, that is, through transistors 23, 24 and 25 a path for boosted signal current from terminal 10 to terminal 9 through a second energizable electrical network includes, terminal 10, conductors 16 and 23*a*, the emitter-collector path of the PNP transistor 23, a conductor 26*a*, a unidirectional conducting means 26, herein comprising a diode, the collector-emitter power circuit of the NPN transistor 24, conductors 24*a* and 14*a*, amplifier power source 14, again, from negative to positive terminal, a conductor 14*c*, the emitter-collector power circuit of the PNP transistor 25, a conductor 27, a voltage-dropping means 28, capacitor 15 and terminal 9.

The signal current direction-detecting activity and amplitude sensing activity, alternately and severally, of the transistor group 17 and 18 or transistor group 23 and 25 and the control thereof on selector transistors 19 and 25 respectively to obtain bidirectional, linear amplification of both half cycles of the AC signal current is as follows: The respective polarity of amplifier terminals 9 or 10 is determined by source-load loop current direction. As seen in FIG. 1, clockwise flow establishes positive polarity at terminal 9 and counterclockwise flow establishes positive polarity at terminal 10. It will be understood that under these conditions negative polarity is established at terminals 10 and 9 respectively. Current flow from terminal 9 to terminal 10 through the amplifier circuit establishes base-emitter current in transistors 17 or 23 depending on whether that current is clockwise or counterclockwise in the source-load loop. Thus, either transistor 17 is energized (clockwise flow) and transistor 23 is shut off or transistor 23 is energized (counterclockwise) and transistor 17 is shut off.

Assuming clockwise flow, transistor 17 conducts. This conduction, through resistor 31, energizes transistor 18 and, through conductor **32*a* turns on selector transistor 19 to permit flow of amplified signal current from source 14, through lead 14*b*, transistor 19 and lead 16, through terminal 10 to the load 6**.

Thus, the current direction-detecting activity of transistors 17 and 18 is accomplished and transistors 23 and 24, and the amplifier network in which they are included is dormant.

Thereafter, the magnitude of conduction of transistors 17 and 18 due to the sensing activity thereof reflects the amplitude of the AC signal flowing in a clockwise direction to, in turn, control the conduction through transistor 19. This is the sensing activity whereby linear amplification is obtained, the energizing of transistors 17, 18 and 19 having previously served to select the path of combined signal current and booster energy from source 14 to the desired load.

It will be understood that when counterclockwise signal current flow is established in the source-load loop the above described detecting and sensing activity takes place through transistors 23 and 24 and that transistor 25 is thus energized also in the manner of a slave component as in the case of transistor 19, to select the proper path for the combined signal and booster energy to the proper load or receiver.

To the end that the detecting and sensing transistors 17 and 18 may respond to the clockwise flow of signal current in the source-load loop, the resistors 29, 30, 31, and 32 are connected as shown in FIG. 1. When clockwise flow in the source-load loop occurs, a flow of current is established by one or the other of the sources 5 or 7 through capacitor 15 (upwardly as shown in FIG. 1) through conductor **17*a*, to energize the emitter-base control path of transistor 17. The circuit for this flow of current is completed by a conductor 17*b*, resistor 29, conductors 29*a* and 30*a*, resistor 30, a conductor 30*b*, voltage dropping means 22 and conductor 16 to the terminal 10**.

The signal current direction detecting activity of the detecting and sensing means is accomplished by the above current flow. As transistor 17 is rendered conducting, collector-emitter conduction is initiated in transistor 18 by a current which flows upwardly through capacitor 15, through conductor **17*a*, the emitter-collector power circuit of transistor 17, resistor 31, the base-emitter control circuit of transistor 18, conductors 18*a*, 18*b* and 30*a*, resistor 30, voltage dropping means 22 and conductor 16. The collector-emitter conduction of transistor 18, in turn, initiates emitter-collector conduction in transistor 19 by establishing a flow of current from amplifier power source 14 through conductor 14*b*, the emitter-base control circuit of transistor 19, resistor 32, control lead 32*a*, the collector-emitter power circuit of transistor 18 and returning to the boost supply 14 through conductors 18*a* and 14*a*. Thus, the flow of current upwardly through capacitor 15 as signal current flows in a clockwise direction through the source-load loop, establishes conduction in the first mode through transistors 17, 18 and 19** of the first energizable electrical network.

It should be noted that after transistors 17, 18 and 19 are conducting, as described above, amplifier power source 14 and transistor 19 provide a path for the control currents of transistors 17 and 18 thereby to bypass resistor 30. More specifically, after transistor 19 begins to conduct, a path for the control current through transistor 17 traverses a path similar to that described above except that, after passing through resistor 29 and before passing through voltage dropping means 22, this current flows through amplifier power source 14 and the collector-emitter path of transistor 19. In a similar manner, after transistor 19 begins to conduct, the path for control current through transistor 18 is shifted away from resistor 30 to also flow through amplifier power source 14 and transistor 19.

After the above-described paths for power and control current through transistors 17, 18 and 19 are established, the amplifier control section functions linearly to apply to the source-load loop a controllable portion of the voltage across amplifier power source 14 in power-aiding relationship to the signal source then operating as such. The magnitude of this voltage is controlled in accordance with the magnitude of the input signal during that portion of the input signal cycle in which current flows in a clockwise direction around the source-load loop. Since the polarity of this added or boost voltage is arranged to produce a clockwise current flow in the source-load loop it is apparent that the desired power-aiding relationship exists between the then operating signal source 5 or 7 and the amplifier power source 14.

To the end that the detecting and sensing transistors 23 and 24 may respond to the counterclockwise flow of signal current in the source-load loop, the resistors 29, 30, 35 and 36 are connected as shown in FIG. 1. When counterclockwise flow in the source-load loop occurs, a flow of current is produced through the following path: conductors 16 and **23*a*, the emitter-base path of transistor 23, conductor 23*b*, resistor 30, conductors 30*a* and 29*a*, resistor 29, conductor 29*b*, voltage dropping means 22, and the capacitor 15 (downwardly as shown in FIG. 1) to terminal 9. The conduction of transistor 23, in turn, causes conduction of transistors 24 to perform the detecting and sensing operation and transistor 25** to perform the selecting operation thereby to establish the second mode in a manner similar to that discussed previously with reference to the first mode.

In order to prevent the uncontrolled conduction of transistors 18 and 19, and transistors 24 and 25, and the resultant undesirable circulating currents, a blocking means herein taking the form of diodes 20 and 26, respectively, may be provided. These diodes prevent the amplifier power source 14 from maintaining a continuous state of conduction in the latter transistors which would prevent any effective control of the amount of boost voltage added between terminals 9 and 10 in accordance with an input signal. The provision of diode 20 prevents amplifier power source 14 from establishing a continuous state of conduction in transistors 18 and 19 yet allows the passage of signal current during the first mode when signal current flows in a clockwise direction around the source-load loop. Similarly, diode 26 prevents amplifier power source 14 from establishing a continuous state of conduction in transistors 24 and 25, yet allows the flow of signal current during the second mode when signal current flows in a counterclockwise direction around the source-load loop.

Figure 2:
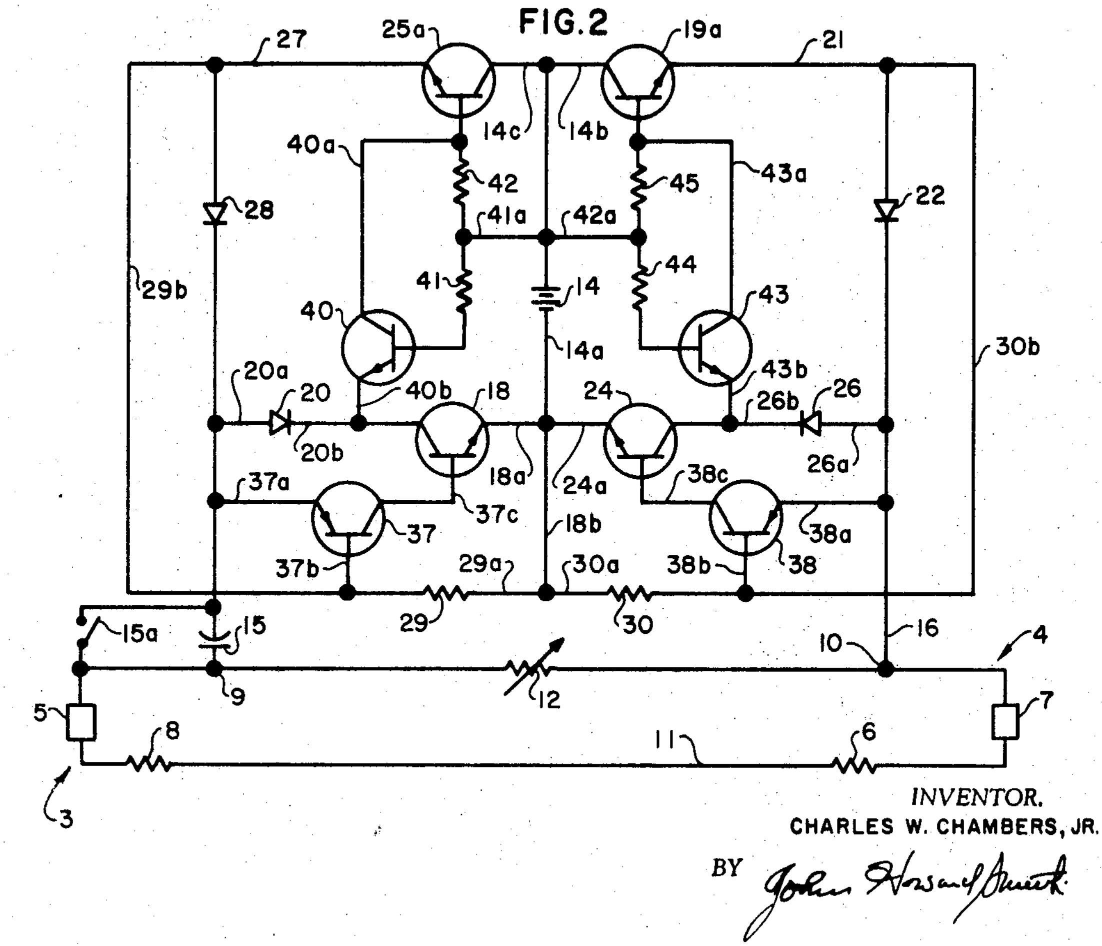
FIG. 2 is a schematic diagram of a modified form of the invention.

To the end that operation of the amplifier control section in the first mode, that is, when current flows through the transistors 17, 18 and 19 inhibits the flow of current in transistors 23, 24 and 25, and to the end that operation of the amplifier control section in the second mode inhibits the flow of current in transistors 17, 18 and 19, the voltage-dropping means 22 and 28 are respectively provided. Because signal current through the amplifier in the first mode establishes a voltage drop across the voltage dropping means 22, and because conductors **23*a* and 30*b* apply this voltage across the emitter-base junction of transistor 23 with a polarity which reverse biases this junction, it is apparent that signal current flow in the first energizable network will inhibit conduction in the second energizable network. Similarly, when signal current flows through the second energizable network, a voltage is established across voltage dropping means 28 which reverse biases the emitter-base junction of transistor 17 to inhibit conduction in the first energizable network. These voltage dropping means may comprise diodes, as shown in FIGS. 1, 2 and 3**, or any other device across which a voltage drop, sufficient to reverse bias the emitter-base junctions of the transistors across which they are connected, appears when signal current passes therethrough.

From the foregoing it will be seen that at any instant, a transmitted intelligence signal may emanate from source 5 to be received by load 6 or, at another instant such a signal may emanate from source 7 to be received by load 8. In either case the intelligence is carried by an AC signal current having alternate half cycles of positive going and negative going waves. When the wave is positive going from source 5, a clockwise flow is established in the source-load loop. When the wave is negative going from source 7, a clockwise flow is also established in the loop. The respective negative and positive going waves from source 5 and source 7 on the other hand establish counterclockwise flows in the source-load loop. The maintenance of a series aiding relationship of the amplifier power source 14 under both clockwise and counterclockwise signal current flow in the source-load loop is accomplished by the detecting and sensing capabilities of the previously described arrangement including transistors 17, 18, 23 and 24 and the path selecting capabilities of the transistors 19 and 25. This source 14 all times amplifies both the positive going and the negative going half cycles of the signal current. The two parts of the amplifier, previously described, serve alternately and severally, to connect the amplifier power source 14 in series aiding or amplifying relationship with the clockwise flow in the loop and also with the counterclockwise flow therein.

Considering the interaction of source 5 and load 6, during that portion of the AC signal current cycle when current flows around the source-load loop in a clockwise direction, that is, during the positive going half cycle of the input signal, there is established a flow of current upward through capacitor 15 to begin conduction in detecting and sensing transistors 17 and 18 and selector transistor 19. Because these transistors when rendered conducting, operatively connect the amplifier power source 14 between terminals 9 and 10 in power-aiding relationship to the signal source 5, the current through the first network including those transistors increases in the clockwise direction around the source-load loop. This increased signal current, in turn, increases the signal current upward in capacitor 15, and, thereby, increases the conduction of detecting and sensing transistors 17, 18 and selector transistor 19. Thus, in the presence of detecting and sensing transistors 17 and 18, the signal current increases in accordance with increases in the amplitude of the input signal from signal source 5 as the amplitude of the input signal approaches its maximum value.

When the amplitude of the input signal from signal source 5 begins to decrease from its peak value, however, the charge stored on capacitor 15 by the above described flow of signal current will force a reduction in the upward flowing signal current through the capacitor. This reduction in signal current, in turn, causes less conduction in transistors 17, 18 and 19 and a further drop in the signal current in a clockwise direction around the source-load loop. This decrease in signal current flow continues until the termination of the first half cycle of the input signal, thus terminating operation in the first mode.

During that portion of the signal current cycle when current flows around the source-load loop in a counterclockwise direction, that is during the negative going half cycle from source 5 or the positive going half cycle from source 7 there is established a flow of current downward through capacitor 15 to begin conduction in direction detecting and amplitude sensing transistors 23 and 24 and network selector transistor 25, as described previously. Because these transistors, when rendered conducting, operatively connect amplifier power source 14 between terminals 9 and 10 in power-aiding relationship to the signal source 5, the current through the second energizable network increases in the counterclockwise direction around the source-load loop. This increased signal current, in turn, increases the current downward through capacitor 15 and thereby increases the conduction of transistors 23, 24 and 25. Thus, the signal current increases in accordance with the input signal from signal source 5 as the amplifier operates in the second mode.

When the amplitude of the input signal from signal source 5 begins to decrease from its peak negative value, however, the charge stored on capacitor 15 by the above described flow of current will force a reduction in the downward flowing current flow through the capacitor. This reduction in current, in turn, causes less conduction in transistors 23, 24 and 25 and a still further reduction in the signal current in a counterclockwise direction around the source-load loop. This reduction in signal current continues until the termination of the second or negative going half cycles of input signal, thus terminating operation in the second mode.

It will be understood, of course, that the same action as that described above takes places when the amplifier is operating with respect to the load 8, that is when the source 7 is transmitting intelligence and the load 8 is receiving that intelligence. Accordingly, it will be seen that the amplifier power source 14 is maintained at all times in power aiding relationship to both positive going and negative going half cycles of the signal current, whether the signal originates at station 3 from source 5 or at station 4 from source 7.

The operation of the foregoing circuitry on an AC input signal with an associated DC current component is similar to that described previously. A DC current component, flowing in either the clockwise or counterclockwise directions around the source-load loop, influences the operation of the amplifier control section only until capacitor 15 charges to the level of the DC voltage component established across bypass means 12. After the charging of capacitor 15 to this DC voltage, the amplifier of the invention functions in the manner described above and responds to only the AC portion of the input signal.

In view of the foregoing, it will be seen that the invention as embodied in FIG. 1 provides an amplifier circuit for sensing the amplitude of an input signal, with or without an associated DC component, and controls the amount of boost voltage added in power aiding relationship to the input signal source to strengthen the signal current in the source-load loop. Thus, the power from both the signal source and the boosting source are fully utilized. Additionally, since the circuit of FIG. 1 amplifies signal currents flowing in the clockwise direction around the source-load loop as well as signal currents flowing in the counterclockwise direction around that loop it will be seen that a bidirectional amplifier is here provided. Thus, the circuit of FIG. 1 is bidirectional, and also amplifies signal currents originating at any station connected in the source-load loop and terminating at a load at any other station in that loop.

When the invention is utilized to amplify a DC signal input, however, it is not required that the amount of boost voltage added between source 5 and load 6, or between source 7 and load 8 be controlled in accordance with those fluctuations in the input voltage which do not comprise a polarity reversal. Instead, it is desirable that a substantially fixed boost voltage of suitable magnitude be established in power-aiding relationship to this DC signal input, and that any AC component of the input signal be passed to the load without substantial attenuation or alteration in waveform. It is apparent that the saturation of transistors 17, 18 and 19 or 23, 24 and 25 respectively, in accordance with a respective first or second DC input signal polarity will produce this desirable effect.

If, for example, capacitor 15 is removed from the circuit of FIG. 1 by closing switch 15*a* then when the amplifier operates in its first mode, the transistors 17, 18 and 19 will be driven to saturation. Thereafter, these transistors connect substantially the entire voltage of amplifier power source 14 between the source 5 and load 6 in power-aiding relationship to source 5. In a similar manner transistors 23, 24 and 25 are driven to saturation when the amplifier operates in its second mode to again establish a power aiding relationship between signal source 5 and amplifier power source 14. Thus, when the invention is used to amplify DC input signals, the detecting and sensing and also the selector means previously described function as respective first and second switch means, that is in an on-off manner, to insert a substantially fixed DC voltage between a source and a load in power-aiding relationship, as compared to the variable conducting function of the detecting and sensing and the selector transistors when an AC signal is being acted on by operation of the switch 15*a* as previously described.

It is apparent that in the circuit of FIG. 1 operation of switch 15*a*, converts the amplifier from a circuit which amplifies the AC portion of an input signal while bypassing the DC portion thereof, to a circuit which amplifies the DC component of an input signal while transmitting the AC component thereof.

The circuit of FIG. 2 is generally similar to that of FIG. 1 and like parts are, therefore, similarly numbered.

An advantage of the circuit of FIG. 2 over FIG. 1 is manifested, as will be more fully explained presently, by the disposition of transistors 37 and 38 in such a manner that they can serve the detecting-sensing function and yet are not disposed in the normal power carrying paths of the amplifier. The transistors 37 and 38 of FIG. 2 are equivalent in operation to respective transistors 17 and 23 of FIG. 1. Thus, transistors 37 and 38 initiate the energization of the respective first and second electrical networks in response to respective clockwise and counterclockwise signal current flow in the source-load loop due to the detecting activity previously described in conjunction with transistors 17 and 23. A second feature of FIG. 2 is the manner in which transistors 18 and 24 establish conduction in the respective network selector transistors 25*a* and 19*a*. In contrast with FIG. 1 wherein the conduction of transistors 18 and 24 initiates the respective conduction of normally nonconducting transistors 19 and 25 to energize the respective first or second electrical networks, the circuit of FIG. 2 is arranged so that the conduction of transistors 18 and 24 terminates the conduction of normally conducting transistors 25*a* and 19*a* respectively to achieve the same operational result.

To the end that the flow of signal current in a clockwise direction around the source-load loop results in the conduction of transistors 18 and 19*a* of the first energizable electrical network and results in the nonconduction of transistors 24 and 25*a* of the second energizable electrical network to produce operation in the first mode, the network selector means 40, herein shown as an NPN transistor, and suitable current proportioning resistors 41 and 42 are provided. Similarly, in order that the flow of signal current in a counterclockwise direction around the source-load loop results in the conduction of transistors 24 and 25*a* of the second energizable electrical network and results in the nonconduction of the transistors 18 and 19*a* of the first energizable electrical network to establish operation in the second mode, the network selector means 43, herein shown as an NPN transistor, and suitable current-proportioning resistors 44 and 45 are provided.

In the circuit of FIG. 2, the normally conducting state of transistor 25*a*, that is the conduction of transistor 25*a* when no input signal is present, is established by a current from amplifier power source 14 which flows through a conductor 41*a*, resistor 42, the base-emitter control path of transistor 25*a*, conductors 27 and 29*b*, resistor 29, and conductors 29*a*, 18*b* and 14*a*. Similarly, the normally conducting state of transistor 19*a* is established by a current from amplifier power source 14 which flows through a conductor 42*a*, resistor 45, the base-emitter control circuit of transistor 19*a*, conductors 21 and 30*b*, resistor 30, and conductors 30*a*, 18*b* and 14*a*.

In order that the flow of signal current in a clockwise direction around the source-load loop terminates conduction in transistor 25*a* of the second flow path, the resistors 41 and 42 are proportioned to establish a predetermined degree of conduction in transistor 40 when transistor 18 conducts. As transistor 18 begins to conduct, turn-on current for transistor 40 flows from amplifier power source 14 through conductor 41*a*, resistor 41, the base-emitter control circuit of transistor 40, conductor 40*b*, the collector-emitter power circuit of transistor 18, and conductors 18*a* and 14*a*. Because the collector-emitter current of transistor 40 is derived from amplifier power source 14 through conductor 41*a*, resistor 42, and conductor 40*a*, it is apparent that the collector-emitter current of transistor 40 must increase at the expense of the base-emitter current of transistor 25*a*. Thus, the conduction of transistor 40 shuts off 25*a* when transistor 18 conducts. In a similar manner the conduction of transistor 43 terminates the conduction of transistor 19*a* when transistor 24 conducts.

Because the conduction of transistor 18 is initiated by the flow of signal current in the clockwise direction around the source-load loop through the detecting and sensing operation of transistor 37, and because the conduction of transistor 18 terminates the conduction of transistor 25*a* by means of transistor 40, it is apparent that the latter signal current flow results in the conduction of transistors 18 and 19*a* of the first energizable electrical network and the nonconduction of transistors 24 and 25*a* of the second energizable electrical network. Thus, the clockwise flow of signal current in the source-load loop establishes operation of the amplifier in the first mode.

Similarly, because the conduction of transistor 24 is initiated by the flow of signal current in the counterclockwise direction around the source-load loop through the detecting and sensing operation of transistor 38, and because the conduction of transistor 24 initiates the nonconduction of transistor 19*a* by means of transistor 43, is apparent that the latter signal current flow results in the conduction of transistors 24 and 25*a* and in the nonconduction of transistors 18 and 19*a*. Thus, the counterclockwise flow of signal current in the source-load loop establishes operation of the amplifier in the second mode. Again the amplifier power source 14 is incorporated in the circuit in power aiding relationship to any of the signal sources.

In FIG. 2, it will be seen that a clockwise flow of signal current in the source-load loop establishes a flow of current upward through capacitor 15, through a conductor 37*a*, the emitter-base path of transistor 37, resistor 29, conductors 29*a*, 18*b*, and 14*a*, amplifier power source 14, conductor 14*b*, the collector-emitter power path of transistor 19*a*, conductor 21, and voltage-dropping means 22 to terminal 10. The conduction of transistor 37, in turn, initiates conduction in transistors 18 and 19*a* in a manner described previously in connection with transistor 40. Thus, it will be seen that, as viewed from transistor 19*a*, energy from signal source 5 through terminal 9 and that from amplifier power source 14 are additively combined to supply the load 6 through terminal 10. Similarly, as signal current flows in a counterclockwise direction around the source-load loop, transistor 38 detects this direction of flow and initiates conduction in transistors 24 and 25*a* to initiate the flow of current in the second electrical network in the manner described above in conjunction with transistors 37, 18, 19*a* and 40.

Accordingly, it will be seen that in the circuit of FIG. 2 the transistors 37 and 38 are removed from the power-carrying paths the amplifier.

Thus, the circuits of FIGS. 1 and 2 detect the direction of signal current flow in the source-load loop and add a voltage in power aiding relationship to the signal source in order to increase this signal current flow whether the source is at station 3 or station 4 in the source-load loop as utilized in FIGS. 1 and 2. It should be noted that the response time of the amplifier to changes in the input signal is limited only by the response time of the transistors used therein. Consequently, the input signal may include not only AC input signals with or without associated DC components of positive or negative polarity, but also single or multiple pulses of current flowing in a single direction or in alternate first and second flow directions in the source-load loop which may have durations ranging from microseconds to indefinitely prolonged DC levels.

From the foregoing description it is apparent that the circuitry of the invention comprises an additive bidirectional amplifier adapted, in its general aspects, to increasing the flow of signal current between a source and a load, and that the circuitry of the invention can be made to amplify a wide variety of inputs including the AC portion of a signal having AC and DC components, the DC portion of a signal having AC and DC components, DC inputs giving rise to currents in either direction through the load and having durations ranging from microseconds to the life expectancy of the component parts, single pulses, pulse trains, and polarity reversals. Additionally, from the symmetry of the amplifier, it is clear that signals originating at either end of the source-load loop are amplified and passed to the other end of the source-load loop without substantial loss in input signal power.

It will be understood that the embodiments shown herein are for explanatory purposes only and may be changed or modified without departing from the spirit and scope of the appended claims.

I claim:

1. In a bidirectional, biterminal amplifier adapted to be disposed between a source of signal current and a load electrically connected thereto, in combination, means for connecting the source of signal current and the load in intelligence-communicating relationship, a source of additive power-boosting DC energy, a plurality of alternately and severally energizable electrical networks, means for electrically, conductively connecting said source of boosting energy in series aiding relationship between the source of signal current and the load through the energized one of said electrical networks and through the terminals of the amplifier, each of said electrical networks including signal current direction detecting and sensing means and selector means, means for connecting said detecting and sensing means in signal current direction detecting and sensing relationship and in series with the source of signal current and said boosting voltage source; means for connecting said selector means in series with said boosting voltage source, said detecting and sensing means and the load; means for controllably connecting said detecting and sensing means to selector means in said amplifier to control the conduction of selector means in accordance with the conduction of said signal current direction detecting and sensing means.

2. In a bidirectional, biterminal amplifier adapted to be disposed between a source of signal current and a load electrically connected thereto in intelligence-communicating relationship, in combination, a source of additive power-boosting DC energy, a plurality of alternately and severally energizable electrical networks, means for connecting each of said energizable networks between the terminals of said amplifier and through said power-boosting energy source, said energizable networks each including signal current direction detecting and sensing means, and selector means, means for connecting respective detecting and sensing means in series relationship between one terminal of said amplifier and one pole of said power boosting energy source, means for connecting respective selector means between the other pole of said power boosting energy source and the other terminal of the amplifier and means for electrically, controllably connecting detecting and sensing means to selector means to afford current flow from said detecting and sensing means connected to one terminal of the amplifier, through said power boosting source and through the selector connected to the other terminal of the amplifier.

3. In a bidirectional, biterminal amplifier adapted to be disposed between a source of signal current and a load, in combination, a source of additive power-boosting DC energy, a plurality of alternately and severally energizable electrical networks, means for electrically, conductively connecting said source of boosting energy in series-aiding relationship between the source of signal current and the load through the energized one of said electrical networks, means for electrically connecting one side of the source of signal current to one terminal of the amplifier, means for electrically connecting one side of the load to the other terminal of the amplifier, means for connecting the other side of the source of signal current to the other side of the load, each of said electrical networks including signal current direction detecting and sensing means having a power circuit and a control circuit and including selector means having a power circuit and a control circuit, means for connecting the power circuit of said detecting and sensing means in current conducting relationship and in series with the source of signal current and said boosting voltage source; means for connecting the power circuit of said selector means in series with said boosting voltage source, and the load; means for controllably connecting the power circuit of said detecting and sensing means to the control circuit of selector means in said amplifier to control the conduction of selector means through the power circuit thereof in accordance with the conduction through the power circuit of said signal current direction detecting and sensing means, and means for connecting the control circuit of the detecting and sensing means between the terminals of the amplifier.

4. In a bidirectional, biterminal amplifier adapted to be disposed between a source of signal current and a load electrically connected thereto in intelligence-communicating relationship, in combination, a source of additive, power-boosting DC energy, a plurality of alternately and severally energizable electrical networks, means for connecting each of said energizable networks between the terminals of said amplifier and through the said power boosting energy source, said energizable networks each including signal current direction detecting and sensing means and selector means, means for connecting the respective detecting and sensing means in series relationship between one terminal of said amplifier and one pole of said power boosting energy source, means for connecting the respective selector means between the other pole of said power-boosting energy source and the other terminal of the amplifier and means for electrically, controllably connecting said detecting and sensing means connected to one terminal of the amplifier to selector means connected to the other terminal of the amplifier.

5. In a bidirectional, biterminal amplifier adapted to be disposed between a source of signal current and a load, in combination, a source of additive power boosting DC energy, a plurality of alternately and severally energizable networks, means for electrically, conductively connecting said source of boosting energy in series aiding relationship between the source of signal current and the load through the energized one of said electrical networks, means for electrically connecting one side of the source of signal current to one terminal of the amplifier, means for electrically connecting one side of the load to the other terminal of the amplifier, means for connecting the other side of the source of signal current to the other side of the load, each of the electrical networks including signal current direction detecting and sensing means having a power current and a control circuit and including selector means having a power circuit and a control circuit, means for connecting the power circuit of said detecting and sensing means in current conducting relationship and in series with the source of signal current and one pole of the boosting voltage source, means for connecting the power circuit of said selector means in series with the other pole of said boosting source and the load; means for controllably connecting the power circuit of said detecting and sensing means to the control circuit of the selector means connected to the load to control the conduction of said selector means through the power circuit thereof in accordance with the conduction through the power circuit of said detecting and sensing means and means for connecting the control circuit of the detecting and sensing means between the terminals of the amplifier.

6. In a bidirectional, biterminal amplifier adapted to be disposed between a source of signal power and a load electrically connected thereto in intelligence communicating relationship, in combination, a source of additive, power-boosting DC energy, a plurality of alternately and severally energizable electrical networks, means for connecting each of said energizable networks between the terminals of said amplifier and through said power boosting energy source, said energizable networks each including signal current direction detecting and sensing means and selector means, means for connecting the respective detecting and sensing means in series relationship between one terminal of said amplifier and one pole of said power-boosting energy source, means for connecting the selector means between the other pole of the power-boosting energy source and the other terminal of the amplifier and means for electrically, controllably connecting the respective detecting and sensing means connected to one terminal of the amplifier to the selector means connected to the same terminal of the amplifier.

7. In a bidirectional, biterminal amplifier adapted to be disposed between a source of signal current and a load, in combination, a source of an additive power boosting DC energy, a plurality of alternately and severally energizable electrically networks, means for electrically, conductively connecting said source of boosting energy in series aiding relationship between the source of signal current and the load through the energized one of said electrical networks, means for electrically connecting one side of the source of signal current to one terminal of the amplifier, means for electrically connecting one side of the load to the other terminal of the amplifier, means for connecting the other side of the source of signal current to the other side of the load, each of said electrical networks including signal current direction detecting and sensing means having a power circuit and a control circuit and including selector means having a power circuit and a control circuit, means for connecting the power circuit of said detecting and sensing means in current conducting relationship and in series with the source of signal current and one pole of said boosting voltage source; means for connecting the power circuit of said selector means in series with the other pole of said boosting voltage source, and the load; means for controllably connecting the power circuit of said detecting and sensing means to the control circuit of the selector means connected between the other pole of the power-boosting source and the source of signal current.